Sept. 16, 1952     J. H. ROETHEL     2,610,876
PIVOTAL JOINT FOR WINDOW CONTROL MECHANISM
Filed Feb. 15, 1946     2 SHEETS—SHEET 2
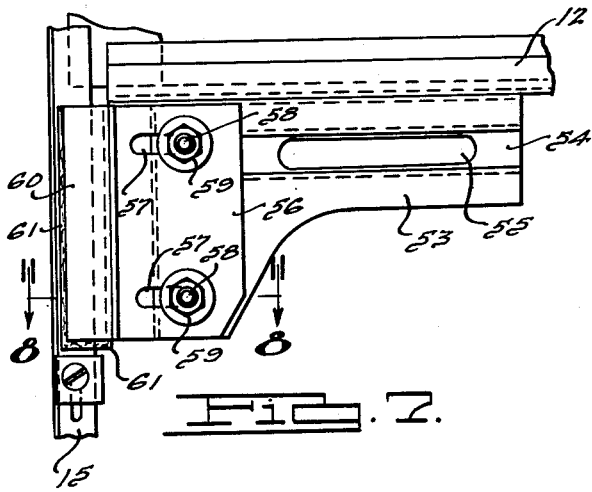
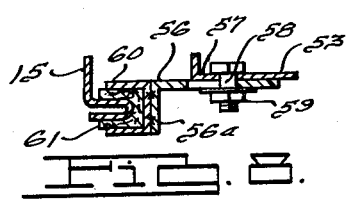
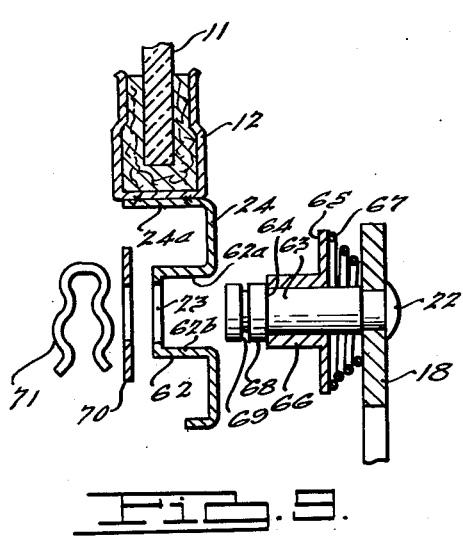
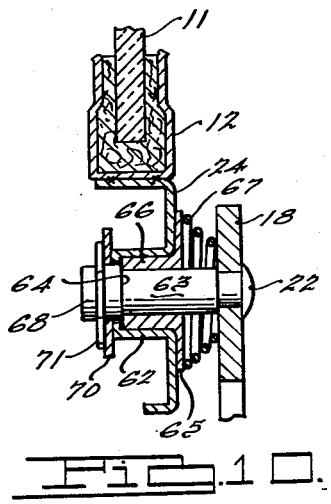
INVENTOR.
John H. Roethel.
BY
Elmer Jamison Gray
ATTORNEY.

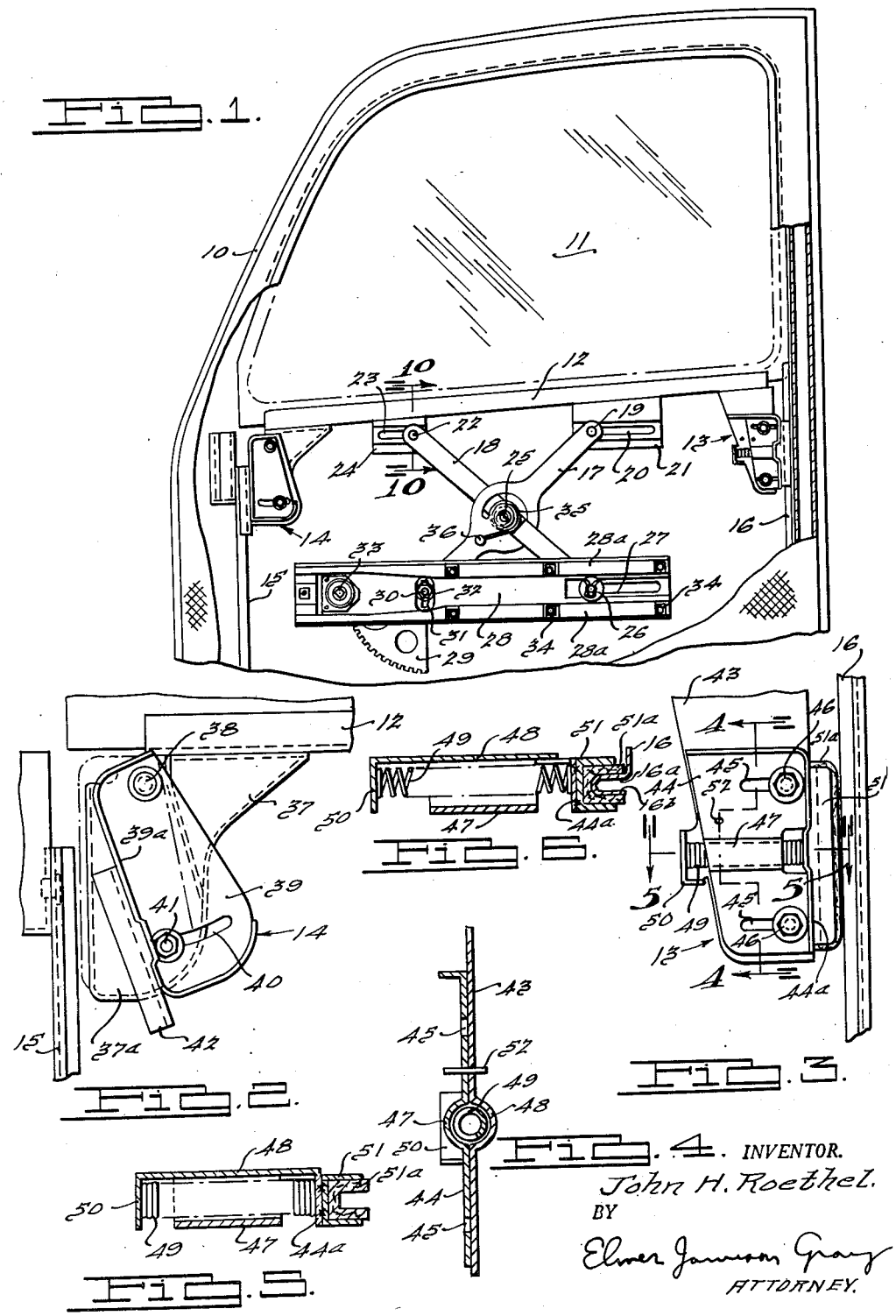
Sept. 16, 1952     J. H. ROETHEL     2,610,876
PIVOTAL JOINT FOR WINDOW CONTROL MECHANISM
Filed Feb. 15, 1946     2 SHEETS—SHEET 1
INVENTOR.
John H. Roethel.
BY
Elmer Jamison Gray
ATTORNEY.

Patented Sept. 16, 1952

2,610,876

UNITED STATES PATENT OFFICE 2,610,876

PIVOTAL JOINT FOR WINDOW CONTROL MECHANISM

John H. Roethel, Detroit, Mich., assignor to Marvel Equipment Corporation, Detroit, Mich., a corporation of Michigan Application February 15, 1946, Serial No. 647,773

14 Claims. (Cl. 287—93)

This invention relates to window control mechanism and particularly mechanism for controlling the operation of glass or transparent panels or the like of vehicles, especially automobile bodies, an object of the invention being to provide an improved mechanism which is compact, relatively simple in construction and economical to manufacture, requires a minimum of space in the body, eliminates considerable frictional resistance to the movement of the window panel, is capable of being easily assembled and adjusted properly within the body, and is adapted for use without material changes to various types of windows.

A further object of the invention is to provide a window panel control mechanism embodying improved means of simple and efficient construction for guiding the window panel within the well of a vehicle body, especially an automobile body, the improved construction being such that the panel is guided with a minimum of frictional resistance to its travel while the guide means in the well is substantially noiseless or constructed in such manner as to avoid chattering or vibrating noises during operation of the vehicle and at the same time is easy to install and adjust for efficient operation.

Still a further object of the invention is to provide improved guide means for a window panel embodying depending guide shoes or members positioned so as to slidingly embrace upright guide members spaced apart longitudinally within the window well of a vehicle body, the guide shoes or either of them being so mounted and the improved construction being such as to permit the same to be readily retracted from normal guiding position and maintained in such retracted position out of contact and free of interference with the upright guide members during installation of the window panel, after which the shoe is readily shiftable into proper guiding relation to its associated guide member.

Another object of the invention is to provide improved regulator means, particularly of the cross-arm type, for supporting the window glass or panel at spaced points embodying improved means for pivotally connecting the arms to the lower edge of the window glass whereby improvements in the operation of the window regulator are achieved and the installation of the window regulator with the window glass is facilitated, thereby effecting substantial savings in production.

Still another object of the invention is to provide improved means for connecting the end of the swinging regulator arm either to the mounting plate or to a member secured to the lower edge of the sliding window panel, such means in its preferred form comprising a transverse stud or pin fixed to the end of the arm and having a pair of abutments in its length, one for confining a yieldable washer or bearing element on the stud and the other for holding in place a device for locking the stud in an aperture in the member or mounting plate after insertion of the stud through such aperture.

Other objects of this invention will appear in the following description and appended claims, reference being had to the accompanying drawings forming a part of this specification wherein like reference characters designate corresponding parts in the several views.

Fig. 1 is an inner fragmentary side elevation, partly broken away and partly in section, of an automobile door embodying the invention.

Fig. 2 is an enlarged fragmentary side elevation of the guide structure shown at the left in Fig. 1.

Fig. 3 is an enlarged fragmentary side elevation of the guide structure shown at the right in Fig. 1.

Fig. 4 is an enlarged vertical section taken substantially through lines 4—4 of Fig. 3 looking in the direction of the arrows.

Fig. 5 is an enlarged section taken substantially through lines 5—5 of Fig. 3 looking in the direction of the arrows and illustrating the guide shoe in retracted position.

Fig. 6 is a view similar to Fig. 5 but illustrating the guide shoe in extended position.

Fig. 7 is an enlarged fragmentary side elevation illustrating a modified guide structure adapted to be used in lieu of the guide structure shown in Fig. 2.

Fig. 8 is a section taken substantially through lines 8—8 of Fig. 7 looking in the direction of the arrows.

Fig. 9 is an exploded view of the construction shown in Fig. 10 illustrating the various parts preparatory to their assembly.

Fig. 10 is a section taken substantially through lines 10—10 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring to the drawings wherein I have illustrated, by way of example, several embodiments of the present invention, there is shown at 10 a door of an automobile body comprising a door frame of any suitable construction formed with a main window opening which is adapted to be closed by means of a vertically slidable glass or other transparent panel 11. It will be understood that the present invention may be utilized in connection with any of the windows of an automobile body and, in addition, may be used generally with various window structures of vehicles or the like.

The sliding panel 11 is mounted in conventional manner within the window opening with the side and top edges thereof embraced within the usual glass run channels around the margin of the window opening when the window panel is fully raised. Secured to the lower edge of the sliding panel 11 is a retainer channel 12 to which the window regulator is adapted to be attached. Carried by the glass retainer channel 12 and depending from opposite ends thereof are guide devices generally indicated at 13 and 14. The guide device 14, shown at the left in Fig. 1 and which for convenience may be considered the front guide device, is adapted to cooperate with a fixed upright guide 15 mounted within the window well formed between inner and outer door or body panels and rigidly secured by suitable brackets to the inner metal door panel. In like manner, the guide device 13, shown at the right in Fig. 1 and which for convenience may be considered the rear guide device, is adapted to cooperate with a fixed upright guide member 16, similar to the guide member 15, and rigidly secured within the window well to the rear upright pillar or frame member of the door.

The window panel 11 may be raised and lowered by means of suitable window regulator mechanism mounted within the window well below the main window opening. In the present instance, there is shown a window regulator of the cross arm type comprising a pair of intersecting crossed arms 17 and 18 for shifting the window panel into and out of the window well. The swinging arm 17 is shown as the driving arm and is provided at its outer end with a connection including a stud 19 adapted to travel within a longitudinal guideway or guide slot 20 formed in a bracket 21 having a horizontal flange at its upper edge secured, as by spot welding, to the bottom of the retainer channel 12. Similarly, the swinging arm 18, which is herein shown as the balance arm of the regulator, is provided at its outer end with a connection including a projecting stud 22 adapted to travel within a longitudinal guide slot or guideway 23 formed in a bracket 24 having a flange at its upper edge secured, as by spot welding, to the bottom of the retainer channel 12. The arms 17 and 18 are pivoted together at 25 at the locality of their crossing and the construction and arrangement of the arms are such that they will pass by each other during operation.

The inner or lower end of the arm 18 is provided with a connection including a stud 26 slidable within a guideway or guide slot 27 in a mounting plate 28. This connection is preferably similar to the connections between the outer ends of the arms 17 and 18 to the brackets 21 and 24 and is later described in connection with Figs. 9 and 10. The inner end of the driving arm 17 is rigidly attached to a gear sector 29 journalled on the mounting plate 28 by a stud 30 which is adjustable within an arcuate slot 31, the stud being held in fixed adjusted position by means of a nut and lock washer 32. The gear 29 is driven by means of a pinion (not shown) secured in the usual manner to a transverse handle shaft 33 which may be turned by a crank handle mounted at the inner side of the door. The mounting plate 28 is stamped integrally from a single metal blank and is formed with longitudinal reinforcing embossments 28a and also screw bosses 34 by means of which it may be secured by screws to the inner door panel. The cross arms 17 and 18 are pivoted together at the locality of their crossing by a pivot stud 25 secured to the arm 18 and upon which the arm 17 turns. The weight of the window panel and attached parts is counterbalanced by means of a spiral or clock-type spring 35, the inner end of which is anchored to the stud 25 and the outer end of which is anchored to a stud 36 secured to the arm 17.

Referring particularly to Fig. 2, the guide device or structure 14 comprises a depending bracket 37 carried by the retainer channel 12. This bracket is preferably in the form of a one-piece stamping having a horizontal flange at its upper edge secured, as by spot welding, to the bottom of the channel 12. The bracket has a depending extension 37a continuously flanged around its edges and preferably positioned so as to lie immediately below the front bottom corner of the window panel 11 when the lower edge of the latter is installed within the retainer channel 12. To the upper end of the bracket 37 there is pivoted at 38 a depending guide shoe carrier 39 in the form of a one-piece stamping which is flanged continuously at 39a around its top, front and bottom edges. The face of the carrier 39 lies smoothly against and in juxtaposed relation to the vertical face of the bracket extension 37a, permitting the carrier to swing in a generally vertical plane about the pivot 38. The lower end of the guide shoe carrier or support 39 is formed with an arcuate guide slot 40 having its center of curvature at the pivot 38 and through which extends a headed bolt 41 threaded into a screw boss on the bracket extension 37a. The bolt 41 has a hex-head conveniently positioned for engagement by a socket wrench, there being a lock washer between the head of the bolt and the face of the carrier member 39. Thus, by loosening the bolt the member 39 may be swung in one direction or the other with the shank of the bolt riding within the arcuate guide slot 40. By tightening the bolt 41 the carrier 39 may be locked in any adjusted position. Rigidly secured to the upright flanged edge 39a of the member 39 is a guide shoe 42 of suitable length and of channel construction adapted to be swung into and out of guiding relation to the fixed upright guide 15. The construction of the guide shoe 42 and the guide 15 is the same as the corresponding elements at the opposite end of the window panel and will be hereinafter described.

The guide device or structure 13 at the rear edge of the window panel comprises a bracket 43 which is in the form of a one-piece stamping having a horizontal flange at its upper edge secured, as by spot welding, to the bottom of the retainer channel 12. Slidingly mounted against the face of the bracket 43 is a guide shoe carrier or support 44 which is also preferably in the form of a one-piece stamping. The carrier member 44 is formed with vertically spaced longitudinally extending guide slots 45 which receive the shanks of headed bolts 46, similar to the bolt 41, threaded into tapped screw bosses in the depending bracket 43. The heads of the bolts 46 are conveniently positioned for engagement by a socket wrench for loosening or tightening the bolts, there being lock washers interposed between the heads of the bolts and the face of the carrier member 44. This member is arranged face to face in juxtaposed relation to the face of the bracket 43 so as to permit free sliding motion of the carrier member back and forth as desired with the shanks of the bolts 46 riding within the guide slots 45. The carrier member or plate 44 and the bracket plate 43 are formed with opposed arcuate embossments 47 and 48 which together form a channel through which freely extends a compression spring 49. The front end of this spring bottoms against a flanged retainer piece 50 stamped out from the rear edge of the bracket plate 43, and the rear end of the spring bottoms against the flanged edge 44a of the carrier plate 44. The spring is thus interposed between a portion of the fixed bracket 43 and a portion of the shiftable carrier member 44 and preferably is held under compression in all positions of the member 44. Rigidly secured, as by spot welding, to the outer face of the flanged edge 44a of the member 44 is a vertically extending guide shoe 51 of suitable length corresponding to the length of the guide shoe 42. This shoe 51 is preferably in the form of a channel having a channel-shaped lining 51a of felt-like or other equivalent soft pile material. This material 51a is firmly bonded to the channel 51 so as to remain intact at all times.

As illustrated in Fig. 6, the guide 16 is in the form of an angle member having a base rigidly attachable, as by spot welding, to the frame or other portion of the door structure. This base terminates in an inwardly or longitudinally extending flange 16a, the metal of which is folded or turned back upon itself to provide a second and parallel flange 16b spaced from the flange 16a. These flanges 16a and 16b are joined by a rounded edge of increased radius. Thus, the flanges 16a and 16b of the guide 16 form a guide track or rail adapted to be embraced by the channel-shaped guide shoe 51. As a result of this construction, there is provided a guide track cooperable with the guide shoe having an effective thickness greater than twice the thickness of the metal and having a rounded edge of sufficient radius to reduce wear on the soft material 51a at the bottom of the groove therein. In addition, the spacing of the flange portions 16a and 16b permits some compressibility or yielding of the sides of the track so as to assist in accommodating or compensating for any slight misalignment of the guide shoe and guide as a result of production inaccuracies. It will be understood that the channel-shaped guide shoe 42 at the opposite end of the window panel is constructed similarly to the guide shoe 51 with its relatively soft liner 51a, and it will also be understood that the guide 15 is constructed similarly to the guide 16.

It is important to note that the length of the slots 45 is sufficient to permit the guide shoe carrier 44, after loosening the bolts 46, to be retracted, i. e. shifted away from the guide 16, to back the shoe 51 off the guide flanges 16a, 16b so that the latter will be entirely out of the groove in the liner 51a as shown in Fig. 3. When the guide is thus retracted the bolts will move to positions near the rear ends of the slots 45 and this retraction of the guide will compress the spring 49 as shown in Fig. 5. Provision is made in the present instance for locking the member 44 in its retracted position, as shown in Figs. 3, 4 and 5, so as to facilitate installation of the window panel and prevent interference or contact of the guide shoe 51 with the guide 16 during installation. In the present embodiment of the invention this is accomplished by providing holes in the member 44 and bracket 43 which are adapted to be brought into registry upon retraction of the member 44, and when these holes register a locking pin 52 may be inserted through the holes, as shown in Fig. 4, thus restraining counter-movement of the member 44 under the expansion effort exerted by the spring 49.

The construction of the guide device is such as to enable the window panel 11 with the retainer channel 12 and guide devices 13 and 14 mounted on the lower edge of the window panel to be installed through the upper end of the window well by tilting the window panel and shifting it downwardly through the narrow slot along the window sill between the upper edges of the inner and outer door panels. Before installing the window panel the guide carrier 39 is swung rearwardly about its pivot 38 to the position shown in Fig. 2 and held in this position by tightening slightly the bolt 41. When thus positioned it will be seen that the guide shoe or channel 42 will be moved entirely out of line with the vertical guide 15. In addition the guide carrier 44 is fully retracted as shown in Fig. 3 and is locked in this position by the pin 52. Thus, when the window panel is ready to be installed the guide devices 13 and 14 will be held in their retracted positions shown in Figs. 2 and 3. The window panel may then be tilted and inserted through the relatively narrow longitudinal slot or opening along the bottom of the window opening and may be shifted downwardly into the window well without interference or contact of the guide shoes 42 and 51 with the fixed upright guides 15 and 16. When the upper edge of the window panel has cleared the header of the window opening it may be tilted back into vertical position within the window well so as to line up the guide shoes 42 and 51 with the guides 15 and 16. When this has been accomplished it is merely necessary for the workman to swing the carrier member 39 forwardly so as to engage the guide shoe 42 with the guide rib or track on the guide member 15 in the manner shown in Fig. 1, after which the bolt 41 is firmly tightened with a socket wrench. Also, it is merely necessary for the workman to withdraw the locking pin 52 thereby permitting the expansion effort of the spring 49 to move the guide shoe 51 automatically into position on the guide rib or track 16a, 16b of the guide 16, as shown in Fig. 6. The spring 49, which is of preferably selected strength, will thus hold the shoe 51 in operative and firm guiding relation to the guide 16 and without requiring the attention of the workman in obtaining the proper sliding fit of the parts. In other words, upon removing the pin 52 the guide shoe 51 will automatically move under the action of the spring 49 into correct position with respect to the guide 16, and thereupon the shoe 51 if desired may be clamped in this position by tightening the bolts 46. However, even if the workman neglects to tighten the bolts 46 the guide shoe 51 by virtue of the pressure exerted by the spring 49 will be yieldingly maintained in proper guiding relation to the guide 16 during operation of the window panel. Thus, a minimum of skill and attention are required not only in installing the window panel but also in positioning the guide devices properly with respect to the fixed upright guides within the window well. It will be understood that the adjusting slots 45 and 40 are not only sufficiently long to permit the guide shoes to be backed clear off the guide flanges or ribs of the guides 15 and 16 but also to be adjusted to increased depth with respect to the guide flanges so as to take up or compensate for wear after continued use.

In the embodiment illustrated in Figs. 7 and 8 there is illustrated a guide device which may be substituted for the guide device shown in Fig. 2 and adapted to be used in conjunction with the guide device shown in Fig. 3. In this embodiment there is provided a bracket 53 horizontally flanged at its upper edge and spot welded to the bottom of the glass retainer channel 12. This bracket has a central portion pressed or stamped to provide an outwardly extending channel 54 with a guide slot 55 punched through the bottom of this channel. This channel and guide slot in the bracket provide a means for connection thereto of a connector on the outer end of the regulator arm 18. Mounted against the end face of the bracket 53 for adjustment thereon is an angle bracket 56 terminating in an inwardly extending flange 56a. The bracket 56 is provided with two vertically spaced horizontal slots 57 through which extend the shanks of bolts 58 which extend through holes in the bracket 53, there being nuts 59 threaded onto the bolts and adapted to be tightened against lock washers to clamp them in fixed adjusted positions within the adjusting slots 57.

To the outer face of the flange 56a is secured, as by spot welding, a channel shaped guide shoe 60 carrying a relatively soft liner 61 and constructed similarly to the guide shoes 42 and 51 for cooperation with the upright guide 15. The length of the adjusting slots 57, similarly to the adjusting slots 45, is sufficient to permit the bracket 56 to be shifted a distance enabling the guide shoe 60 to be backed entirely off the guide 15, thus serving the same purpose as the construction shown in Fig. 2. The construction of the portion of the bracket 53 having the guide slot 55 and channel 54 is preferably the same as the construction shown in Figs. 9 and 10.

In the embodiment shown in Figs. 9 and 10 the construction of the bracket 24 together with the connection of the window regulator arm 18 thereto is shown. It will be understood that the same construction is provided for the connection of the window regulator 17 to the bracket 21 and also for the connection of the inner end of the regulator arm 18 to the mounting plate 26. In other words, the connecting means of the regulator arms at points 19, 22 and 25 are preferably identical and correspond to the construction shown in Figs. 9 and 10.

Referring to Figs. 9 and 10, the bracket 24 is formed with a flange 24a along its upper edge spot welded to the bottom of the glass retainer channel 12. The bracket is pressed or rolled to provide a longitudinally extending channel 62 forming upper and lower parallel horizontal walls 62a and 62b. After the channel 62 has been formed a portion of the back wall is punched out so as to form the horizontally extending guide slot 23. The stud 22 is riveted to the outer end of the regulator arm 18 and is provided with a cylindrical transverse shank 63 which is machined down from larger diameter stock so as to provide a shoulder or abutment 64 spaced outwardly from the regulator arm. Slidable freely on the shank 63 but trapped between the abutment 64 and the regulator arm is a bearing washer or compression element comprising a disk-like portion 65 and an integral cylindrical bearing portion 66. Interposed between the disk-like portion 65 and the regulator arm is a compression spring 67 which exerts pressure forcing the bearing portion 66 of the washer outwardly against the shoulder 64. Outwardly of the abutment 64 the shank 63 has a portion 68 of somewhat larger diameter but preferably less than the height of the slot 23. This portion 68 of the stud is machined to provide an annular groove 69 forming a second abutment spaced outwardly from the abutment 64.

When the regulator arm is assembled with the bracket 24 the stud is inserted through the slot 23 thereby positioning the cylindrical bearing portion 66 of the washer within the channel 62 so as to have bearing engagement with the walls 62a and 62b. The stud is forced through the slot 23 a sufficient distance by exerting pressure on the regulator arm so as to permit a washer 70 to be inserted over the end 68 of the stud and to be positioned inwardly of the slot 69. The workman then by the use of a suitable tool forces the spring cotter pin 71 transversely over the stud so as to snap it into position within the annular slot or groove 69 thereby locking the washer 70 against removal and also locking the stud 22 against withdrawal from the channel 62. Since the spring 67 is constantly under compression it will hold the washer 70 and the flange 65 of the bearing member 66 in the position shown in Fig. 10, permitting the bearing member 66 to slide freely with a minimum of friction within the channel 62, the portion 68 of the stud being preferably of less diameter than the height of the slot 23 so as not to ride against the edges thereof. In any event, in order to achieve best results I prefer to have the portion 68 free of any substantial frictional engagement with the raw edges of the slot 23. With such a construction a very smooth operation is achieved while providing a connector means capable of easy and quick assembly. This is greatly facilitated by trapping the bearing washer or element on the portion of the stud of reduced diameter between the inner abutment 64 and the regulator arm.

I claim:

1. A window regulator comprising a swinging arm, a transversely projecting stud secured to an end of the arm, a member having a longitudinal channel forming upper and lower spaced generally parallel horizontal bearing surfaces, a connecting wall between the edges of said bearing surfaces furthest away from said arm, said wall having a longitudinal slot, and bearing means on said stud between said wall and arm in sliding engagement with said surfaces, said stud having a portion projecting through said slot, and means carried on said portion to prevent withdrawal of said stud through said slot thereby to maintain said bearing means in engagement with said surfaces.

2. A window regulator comprising a swinging arm, a transversely projecting stud secured to an end of the arm, a member having a longitudinal channel forming upper and lower spaced generally parallel horizontal bearing surfaces and a back wall, said wall having a longitudinal slot, bearing means on said stud having a bearing portion within said channel in sliding engagement with said surfaces, said stud having a portion projecting through said slot, the diameter of said projecting stud portion being slightly less than the distance between the edges of the slot whereby said stud portion is free of substantial frictional engagement with the edges of said slot, and a removable device attached to said stud portion to prevent withdrawal of the same through said slot.

3. A window regulator comprising a swinging arm, a transversely projecting stud secured to an end of the arm, a member having a longitudinal channel forming upper and lower spaced generally parallel horizontal bearing surfaces, said surfaces being connected at their edges furthest away from said swinging arm by a vertical back wall, said wall having a longitudinal slot, said stud having a bearing within said channel in sliding engagement with said surfaces and a portion projecting through said slot, and a releasable device attached to the end of the stud adapted to abut the outer side of the back wall to prevent withdrawal of said bearing from the channel.

4. A window regulator comprising a swinging arm, a transversely projecting stud secured to an end of the arm, a member having a longitudinal channel forming upper and lower spaced generally parallel horizontal bearing surfaces and a back wall, said wall having a longitudinal slot, a bearing within said channel in sliding engagement with said surfaces, said bearing comprising a spring pressed element slidable on the stud, said stud having a portion projecting through said slot, and means attached to said projecting portion to prevent withdrawal of the same through said slot.

5. A window regulator comprising a swinging arm, a transversely projecting stud secured to an end of the arm, a member having a longitudinal channel forming upper and lower spaced generally parallel horizontal bearing surfaces and a back wall, said wall having a longitudinal slot, a bearing element mounted on said stud and having a portion in sliding engagement with said surfaces and a second portion abutting the front face of said member, said stud having a portion projecting through said slot, and means attached to said projecting portion to prevent withdrawal of the same through said slot.

6. A window regulator comprising a swinging arm, a transversely projecting stud secured at one of its ends to an end of the arm, said stud having an enlarged portion on the other end thereof, a member having a longitudinal channel forming upper and lower spaced generally parallel horizontal bearing surfaces and a back wall, said wall having a longitudinal slot, a bearing within said channel in sliding engagement with said surfaces, said bearing comprising a spring pressed element slidable on the stud and retained thereon between the regulator arm and said enlarged portion of the stud, which enlarged portion projects through said back wall slot, and means attached to said enlarged portion adapted to abut the outer side of said back wall to prevent withdrawal of said bearing from the channel.

7. A window regulator comprising a swinging arm, a transversely projecting stud secured at one of its ends to an end of the arm, said stud having an abutment on its other end, a member having a longitudinal channel forming upper and lower spaced generally parallel horizontal bearing surfaces and a back wall, said wall having a longitudinal slot, a bearing element mounted on said stud and having a portion in sliding engagement with said surfaces and a second portion abutting the front face of said member, said stud having a portion projecting through said slot, said bearing element being retained on said stud between the regulator arm and said abutment on the stud, and means attached to said abutment adapted to abut the outer side of said back wall to prevent withdrawal of said bearing element out of engagement with said surfaces.

8. A window regulator comprising a swinging arm, a transversely projecting stud secured to an end of the arm, a member having a longitudinal channel forming upper and lower spaced generally parallel horizontal bearing surfaces and a back wall, said wall having a longitudinal slot, a bearing comprising a spring pressed element having a cylindrical portion within said channel in sliding engagement with said surfaces and a disk-like portion engageable with the front face of said member, said bearing being mounted on the stud, said stud having a portion projecting through said slot, and a removable device attached to said stud portion to prevent withdrawal of the same through said slot.

9. A window regulator comprising a swinging arm, a transversely projecting stud secured at one of its ends to an end of the arm, said stud having an enlarged portion on its other end, a member having a longitudinal channel forming upper and lower spaced generally parallel horizontal bearing surfaces and a back wall, said wall having a longitudinal slot, a bearing comprising a spring pressed element having a cylindrical portion within said channel in sliding engagement with said surfaces and a disk-like portion engageable with the front face of said member, said bearing being slidable on the stud and retained thereon between the regulator arm and said enlarged portion of the stud, which enlarged portion projects through said back wall slot, and means attached to said enlarged portion adapted to abut the outer side of said back wall to prevent withdrawal of said bearing from the channel.

10. A window regulator comprising a swinging arm, a transversely projecting stud secured to an end of the arm, a member having a longitudinal channel forming upper and lower spaced generally parallel horizontal bearing surfaces, said surfaces being connected at their edges furthest away from said arm by a vertical back wall, said wall having a longitudinal slot, said stud having a bearing within said channel in sliding engagement with said surfaces and a portion projecting through said slot, and a removable device in engagement with said last named portion for preventing withdrawal of the stud from said slot.

11. A window regulator comprising a swinging arm, a transversely projecting stud secured at one of its ends to an end of the arm, said stud having at its other end an enlarged portion, a member having a longitudinal channel forming upper and lower spaced generally parallel horizontal bearing surfaces and a back wall, said wall having a longitudinal slot, a bearing within said channel in sliding engagement with said surfaces, said bearing comprising a spring pressed element slidable on the stud and retained thereon between the regulator arm and said enlarged portion of the stud, which enlarged portion projects through said back wall slot, and a removable device attached to a part of the enlarged stud portion for preventing withdrawal of the stud from the slot.

12. In a window regulator, a swinging window regulator arm, a member, said member having a longitudinal channel formed therein and providing upper and lower vertically spaced horizontal longitudinal bearing surfaces, said surfaces being connected at their edges furthest away from said arm by an upright back wall, said upright back wall being formed with a longitudinal slot of less height than the distance between said surfaces, a device attaching the swinging arm to the member and provided with a bearing slidable within said channel against said surfaces and a part projecting through said slot, and means attached to said projecting part for preventing withdrawal thereof from said slot.

13. In a window regulator, a swinging window regulator arm, a member, said member having a longitudinal channel formed therein and providing upper and lower vertically spaced horizontal longitudinal bearing surfaces, said surfaces being connected at their edges furthest away from said arm by an upright back wall, said back wall formed with a longitudinal slot of less height than the distance between said surfaces, a device attaching the swinging arm to the member and provided with a bearing slidable within said channel against said surfaces and a part projecting through said slot, said slot having a width slightly greater than the cross-sectional dimension of said projecting part whereby said part is free of substantial frictional engagement with the edges of the slot, and means attached to said projecting part for preventing withdrawal thereof from said slot.

14. In a window regulator, a swinging window regulator arm, a member to which an end of the arm is attachable, said member having a longitudinal channel formed therein and providing upper and lower vertically spaced longitudinal bearing surfaces, said channel having an upright back wall formed with a longitudinal slot of less height than the distance between said surfaces, and a device attaching the swinging arm to the member and provided with a spring pressed bearing slidable within said channel against said surfaces and a part projecting through said slot, and means attached to said projecting part for preventing withdrawal thereof from said slot.

JOHN H. ROETHEL.

REFERENCES CITED

The following references are of record in the file of this patent:

UNITED STATES PATENTS

| Number | Name | Date |
|---|---|---|
| 1,563,391 | Nicholson | Dec. 1, 1925 |
| 1,911,652 | Starr | May 30, 1933 |
| 2,017,244 | Gudmundsen | Oct. 16, 1935 |
| 2,059,027 | Potter | Oct. 27, 1936 |
| 2,076,938 | Chandler | Apr. 13, 1937 |
| 2,168,242 | Roethel | Aug. 1, 1939 |
| 2,313,249 | Lum | Mar. 9, 1943 |
| 2,319,088 | Roethel | May 11, 1943 |
| 2,409,068 | Roethel | Oct. 8, 1946 |